United States Patent [19]
Mecks et al.

[11] 3,882,994
[45] May 13, 1975

[54] APPARATUS FOR CONVEYING AND ORIENTING AEROSOL VALVES

[75] Inventors: Karl Mecks, Gau-Odernheim; Hugo Schindel, Saulheim, both of Germany

[73] Assignee: Rationator-Maschinenbau GmbH, Hillesheim, Rheinhessen, Germany

[22] Filed: Oct. 26, 1973

[21] Appl. No.: 410,294

[30] Foreign Application Priority Data
July 14, 1973 Germany...................... 2336001

[52] U.S. Cl............. 198/253; 198/33 DD; 221/168; 209/73; 198/273; 198/276; 198/277
[51] Int. Cl............................................. B65g 47/24
[58] Field of Search .................. 209/73, 74, 97, 993; 221/164, 165, 166, 167, 168; 198/33 AA, 33 AD

[56] References Cited
UNITED STATES PATENTS

| | | | |
|---|---|---|---|
| 2,549,316 | 4/1951 | Kremer et al. | 209/97 |
| 2,891,697 | 6/1959 | Beckers | 198/33 AA |
| 3,054,170 | 9/1962 | Benichasa et al. | 221/167 |
| 3,148,762 | 9/1964 | Gleason | 198/33 AD |
| 3,276,566 | 10/1966 | Raasch | 198/33 AD |
| 3,690,437 | 9/1972 | Kammann | 198/33 AA |
| 3,741,367 | 6/1973 | Castiglioni | 198/33 AA |

*Primary Examiner*—Allen N. Knowles
*Attorney, Agent, or Firm*—Kurt Kelman

[57] ABSTRACT

An apparatus for sorting elongated narrow parts having a head, comprises a hopper one of whose sides is closed off by an obliquely upwardly extending conveyor band with a series of entrainment elements for entraining parts in the hopper to an upper end of the conveyor band. Another hopper adjacent the upper conveyor band end receives the entrained part therefrom and gravity feeds them through a tube to a vibrating trough arranged therebelow. The depth of the trough corresponds substantially to the length of the long narrow part portions which are preferably received in elongated compartments of the trough extending from an inlet end to a common outlet end.

6 Claims, 5 Drawing Figures

APPARATUS FOR CONVEYING AND ORIENTING AEROSOL VALVES

The present invention relates to improvements in apparatus for sorting elongated narrow parts having a head and a long narrow portion extending therefrom, such as aerosol valves or closures with standpipes or risers having a length, for instance, in excess of about 4 inches and up to about 13 inches.

While sorting apparatus of various types are known, it is the primary object of this invention to provide such an apparatus which may be used in connection with various forms of parts of the indicated type, with a minimum of, or without any, manual labor.

The above and other objects are accomplished with an apparatus comprising the combination of a funnel-shaped hopper having an open side and arranged to receive the parts, an obliquely upwardly movable conveyor band closing the open side, a series of transversely extending entrainment elements mounted on the conveyor band and projecting into the hopper for entraining respective ones of the parts received in the hopper, another hopper arranged adjacent the upper end of the conveyor band for receiving the parts entrained by the entrainment elements, a gravity tube having an upper and a lower end, the upper tube end being in communication with the other hopper to receive the parts therefrom and to convey them to the lower tube end by gravity, and a vibrating trough in communication with the lower tube end to receive the gravity-conveyed parts therefrom, the depth of the trough corresponding substantially to the length of the long narrow part portions.

Such an apparatus is of simple construction and sorts parts of the indicated type at high speed without the use of manual labor.

The above and other objects, advantages and features of the invention will become more apparent from the following detailed description of a now preferred embodiment thereof, taken in conjunction with the accompanying drawing wherein FIG. 1 is a side elevational view of one portion of the apparatus comprising the funnel-shaped hopper with its conveyor band;

Figure 2:
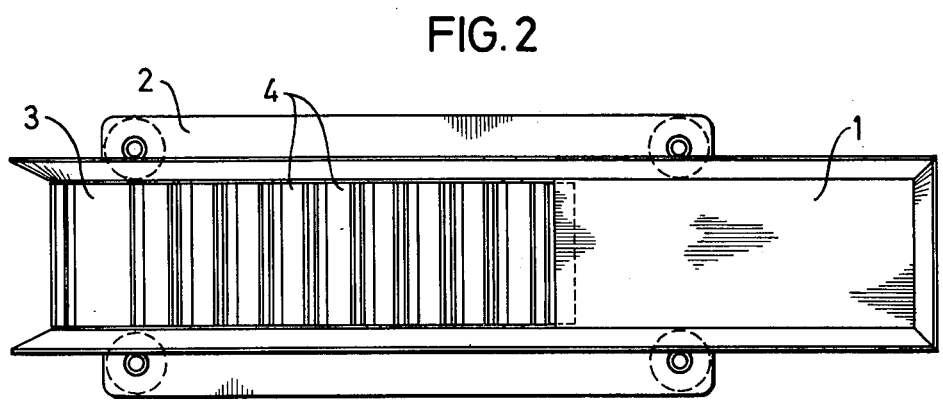
FIG. 2 is a top view of FIG. 1.

Referring now to the drawing, funnel-shaped hopper 1 is shown affixed to support 2. As best seen in FIG. 2, the hopper is of elongated rectangular cross section, with two long side walls and one short side wall. The open side of the funnel-shaped hopper opposite the short side wall is formed by obliquely upwardly extending conveyor band 3. The width of the conveyor band corresponds to the width of hopper 1 so that it closes the open side thereof. The conveyor band is supported on base support 2 and hopper 1. A series of transversely extending entrainment elements or ledges 4 are mounted on conveyor band 3 and project into the hopper for entraining respective ones of parts 12 received and stored in hopper 1.

Figure 1:
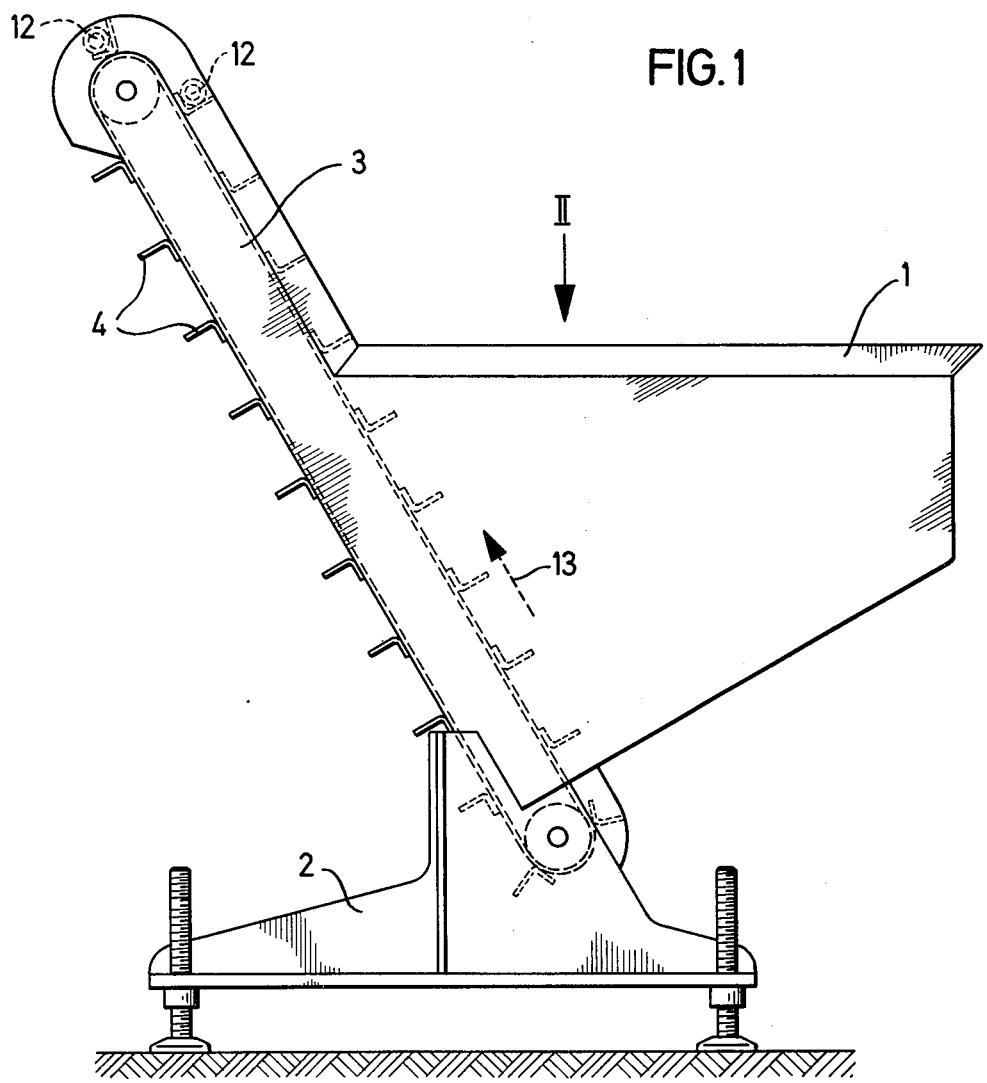
Figure 3:
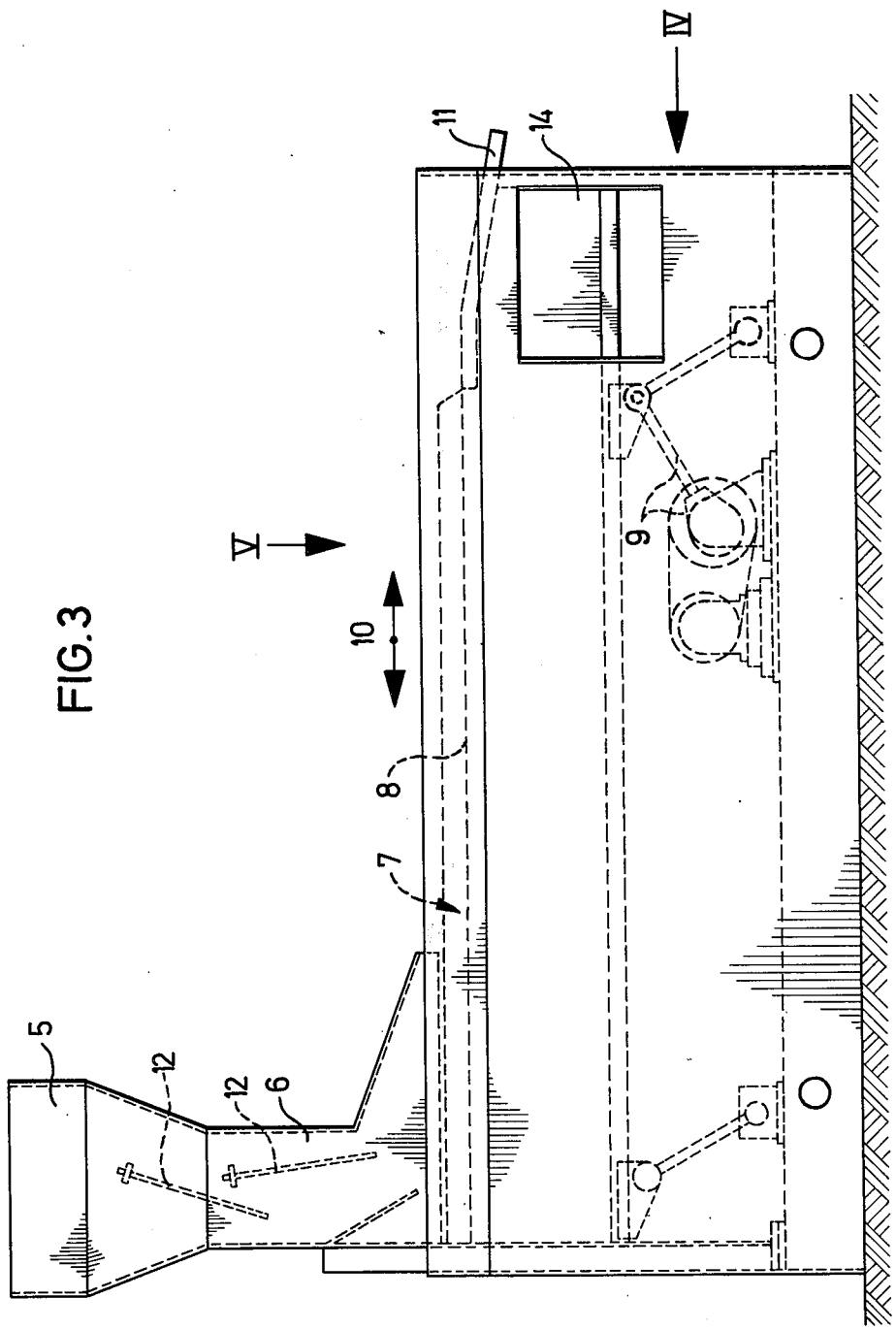
FIG. 3 is a side elevational view of the second portion of the apparatus comprising the other hopper, the gravity tube and the vibrating trough, this portion being disposed side-by-side with the one portion, with the other hopper adjacent the upper end of the conveyor band.
Figure 4:
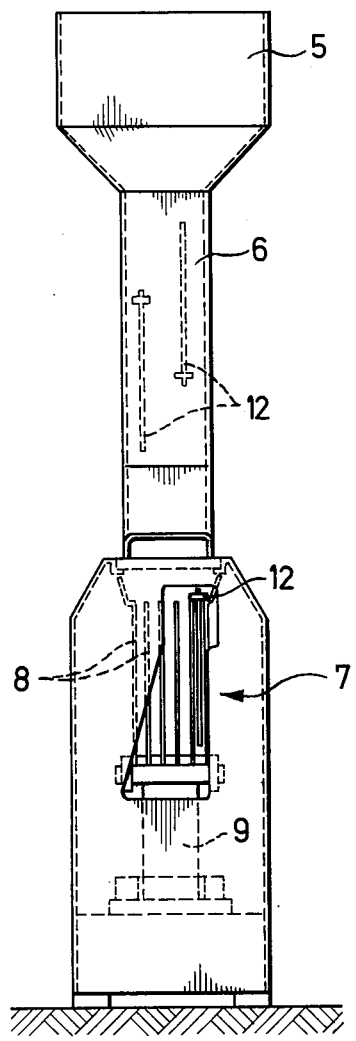
FIG. 4 is an end view of FIG. 3 in the direction of arrow IV.
Figure 5:
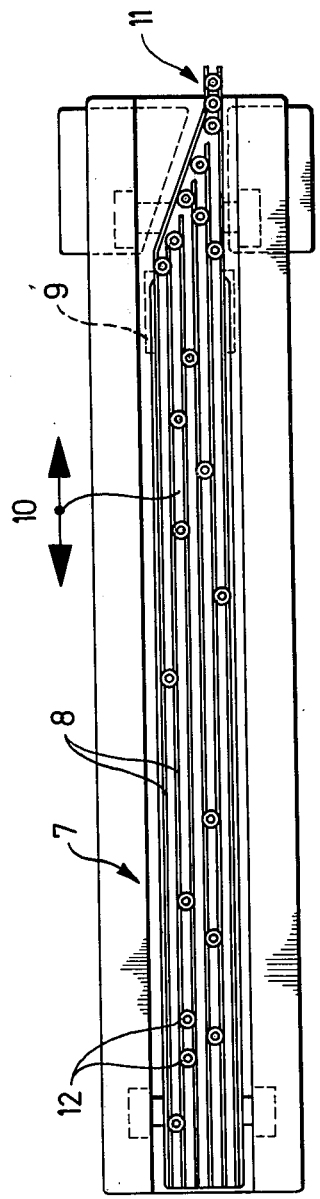
FIG. 5 is a top view of the vibrating trough, seen in the direction of arrow V of FIG. 3, with the other hopper and gravity tube removed.

The combined apparatus includes the portion illustrated in FIGS. 1 and 2, and the second portion shown in FIGS. 3 to 5, it being understood that the second portion, as shown in FIG. 4, is disposed to the left of the first portion shown in FIG. 1, with the other hopper 5 of the second portion adjacent the upper end of the conveyor band for receiving the parts 12 entrained by entrainment elements 4. As seen in FIG. 1, when the conveyor band turns at its upper end to assume its downward course, the uppermost part 12 will be gravity fed into adjacent hopper 5.

Referring now to FIG. 3, parts 12 fall through the open bottom of hopper 5 into the upper end of gravity tube 6 which is in communication with hopper 5 to receive parts 12 therefrom and to convey them to the lower end of the tube by gravity. The falling parts are received in vibrating trough or chute 7 whose inlet end is in communication with the lower tube end. The depth of the trough corresponds substantially to the length of the narrow part portions, i.e., the trough is at least as deep as the parts are long to hold the parts substantially upright therein.

As seen in FIGS. 4 and 5, a plurality of webs 8 extend longitudinally of the trough and divide it into a plurality of elongated compartments which feed into a common outlet end 11 of the trough. The spacing between the webs is less than the width of the heads of parts 12 whereby only the long narrow part portions may enter into the compartments wherein they are suspended by engagement of the heads with two adjacent webs. A cam drive 9 vibrates the trough in the longitudinal direction of the trough, as indicated by arrow 10, whereby the suspended parts are guided in their respective trough compartments from the inlet end to common outlet end 11 wherein all the parts merge into a single compartment.

The operation of the apparatus will be obvious from the above description of the structure and may be summarized as follows:

The parts to be sorted are placed into funnel-shaped hopper 1 whence they are entrained upwardly by dogs 4 as the conveyor band moves in the direction of arrow 13. The hopper may be filled completely with parts while the entrainment elements will convey one part at a time. At the upper end of the conveyor band, each entrained parts 12 will fall into hopper 5 and through tube 6. Since the diameter of the tube is less than the length of the parts, they will be more or less vertically aligned during their fall through the tube. The more or less vertically falling parts 12 will be received, with their heads upwards, in the trough compartments. The longitudinally directed vibration of the trough will move the parts in their compartments towards common outlet end 11 where they are aligned in single file. Each part may then be removed for subsequent assembly or other work.

Any parts which have not been properly aligned in the trough may leave the same through a lateral port 14 (FIG. 3).

The apparatus described hereinabove has proved to be of particular value in sorting parts having a minimum length of about 4 inches and a maximum length of about 13 inches. In sorting operations with such parts, it has been found advantageous to impart to cam drive 9 a stroke of about 7 to 4 mm, preferably about 6 mm. The frequency was about 700 to 1,000 vibrations per minute.

We claim:

1. An apparatus for sorting aerosol valves or closures and the like elongated narrow parts having a head and a bendable long narrow portion extending therefrom, comprising the combination of
   1. a funnel-shaped hopper having an open side, the hopper being arranged to receive the parts;
   2. an obliquely upwardly extending conveyor band closing the open side,
      a. a series of transversely extending entrainment elements mounted on the conveyor band and projecting into the hopper for lengthwise supporting and entraining respective ones of the parts received in the hopper;
      b. the conveyor band being movable in an upward direction toward an upper end thereof;
   3. another hopper arranged adjacent the upper end of the conveyor band for receiving the parts entrained by the entrainment elements;
   4. a gravity tube having an upper and a lower end, the upper end being in communication with the other hopper to receive the parts therefrom and to convey them to the lower end by gravity; and
   5. a vibrating trough in communication with the lower tube end to receive the gravity-conveyed parts therefrom,
      a. the depth of the trough corresponding substantially to the length of the long narrow part portions, and
      b. a plurality of webs extending longitudinally of the trough and dividing the same into a plurality of elongated compartments, the trough having an inlet end in communication with the gravity tube and a common outlet end into which all of said compartments feed.

2. The apparatus of claim 1, wherein the width of the funnel-shaped hopper corresponds to the width of the conveyor band whereby the conveyor band forms a side wall of the funnel-shaped hopper.

3. The apparatus of claim 1, wherein the spacing between the webs is less than the width of the part heads whereby only the long narrow part portions may enter into the compartments.

4. The apparatus of claim 1, further comprising a cam drive for vibrating the trough in the longitudinal direction of the trough.

5. The apparatus of claim 4, wherein the cam drive has a stroke in the range of about 3 to 7 mm and a frequency of about 700 to 1,000 vibrations per minute.

6. The apparatus of claim 1, wherein the gravity tube has a diameter less than the length of the parts.

* * * * *